Nov. 8, 1932.  C. R. BUTTON ET AL  1,887,229
HYDRAULIC POWER TRANSMISSION
Filed June 15, 1929  4 Sheets-Sheet 1

WITNESS
H. L. Meade.

INVENTOR
C. R. Button
BY M. E. Esty
Denison & Thompson
ATTORNEYS.

Nov. 8, 1932.   C. R. BUTTON ET AL   1,887,229
HYDRAULIC POWER TRANSMISSION
Filed June 15, 1929   4 Sheets-Sheet 2
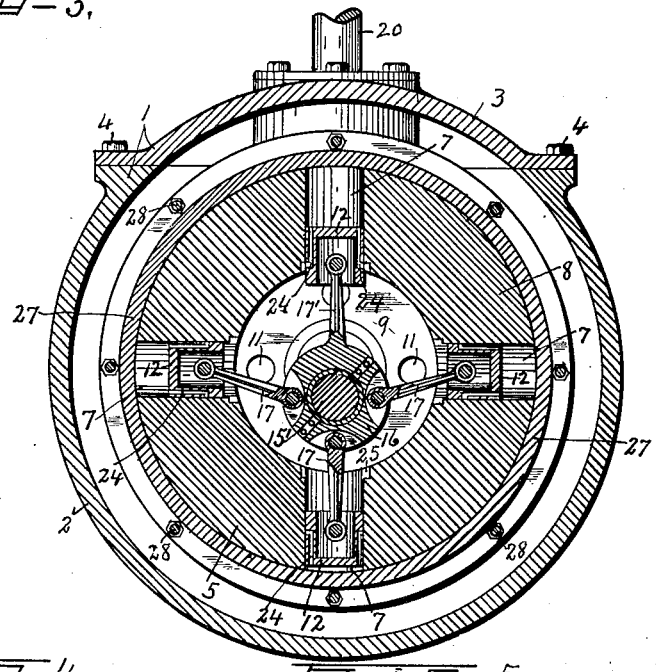
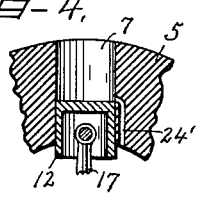
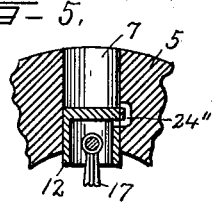
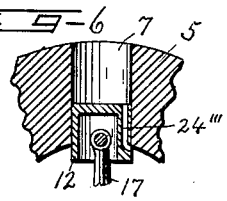
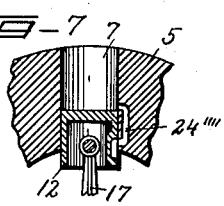

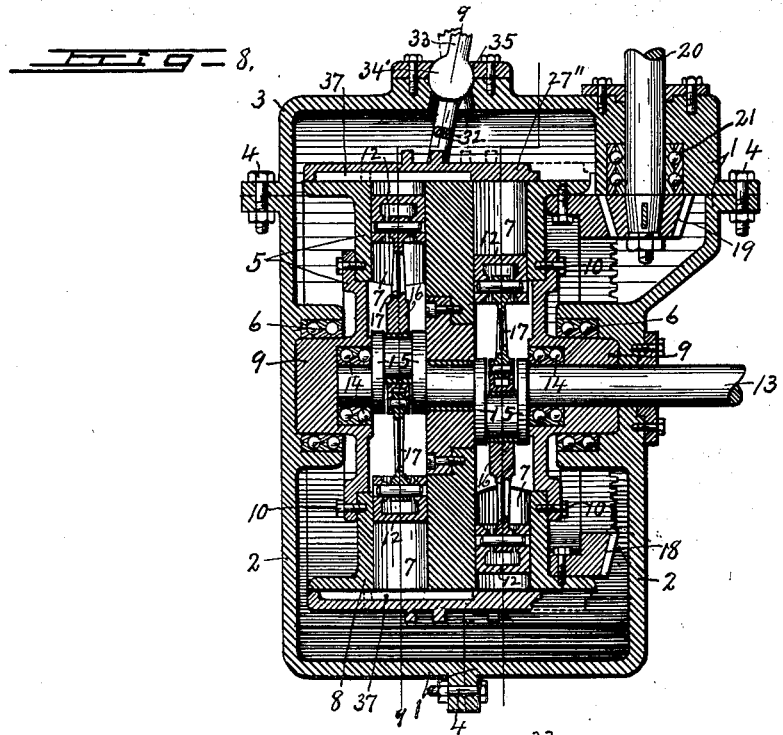
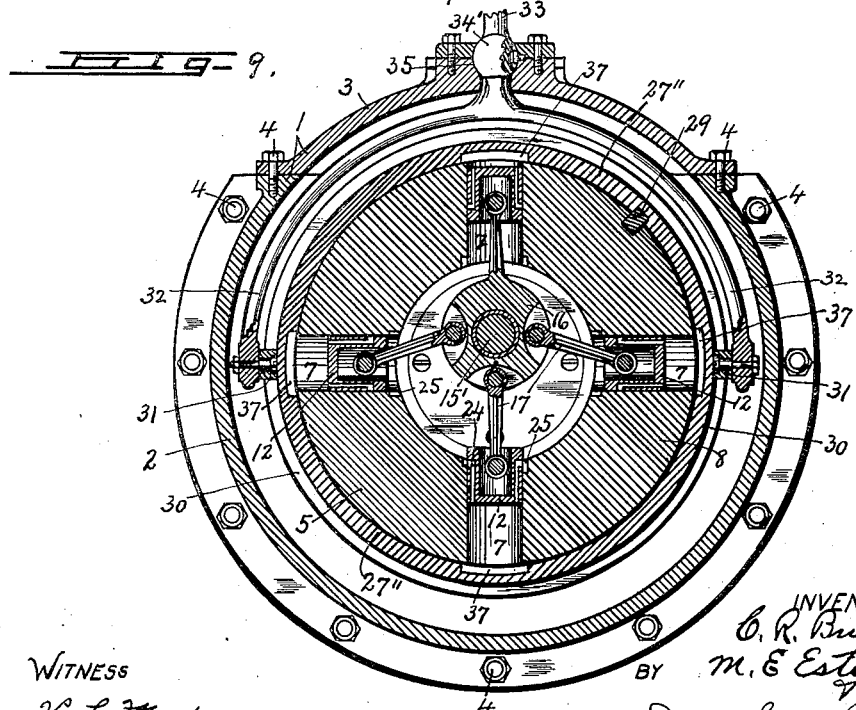

Nov. 8, 1932.  C. R. BUTTON ET AL  1,887,229
HYDRAULIC POWER TRANSMISSION
Filed June 15, 1929  4 Sheets-Sheet 4

WITNESS
K. L. Meade.

INVENTOR
C. R. Button and
M. E. Esty
BY
Denison & Thompson
ATTORNEYS.

Patented Nov. 8, 1932

1,887,229

UNITED STATES PATENT OFFICE

CLARENCE RAY BUTTON AND MAYNARD E. ESTY, OF CANANDAIGUA, NEW YORK, ASSIGNORS OF ONE-THIRD TO STEPHEN L. VAN VOORHIS, OF CANANDAIGUA, NEW YORK

HYDRAULIC POWER TRANSMISSION

Application filed June 15, 1929. Serial No. 371,174.

This invention relates to a hydraulic power transmission for driving motor vehicles and other mechanisms at variable speeds and involves the use of a case or housing containing a suitable liquid, such as oil, and a power-driven rotor having a plurality of cylindrical bores for receiving the liquid and a corresponding number of pistons movable in the cylinders and operatively connected to one or more crank shafts for transmitting rotary motion thereto.

Each cylinder is provided with an exit port connecting it with the interior of the housing to permit the circulation of the liquid therethrough when the ports are open to a greater or lesser degree and the main object of the present invention is to provide simple and efficient means for controlling the exit ports so as to vary the effective capacity thereof and thereby to vary the speed ratio between the driving and driven elements.

Other objects and uses relating to specific parts of this mechanism will be brought out in the following description.

In the drawings:—

Fig. 3 is a transverse vertical sectional view taken in the plane of line 3—3, Fig. 1.

Figs. 4, 5, 6 and 7 are detail sectional views of one of the pistons and adjacent portion of the cylinder showing modified bypasses for the liquid.

Fig. 8 is a longitudinal sectional view similar to Fig. 1 but showing a modified valve ring for controlling the exit ports of both sets of pistons and a single crank shaft instead of the two coaxial crank shafts, shown in Fig. 1.

Fig. 9 is a transverse vertical sectional view taken in the plane of line 9—9, Fig. 8.

The construction shown in Figures 1 to 3 inclusive comprises a cylindrical casing or housing —1— composed of opposite similar sections —2— and —2'— and a cap or top section —3— bolted or otherwise removably secured by clamping bolts —4— to permit access to the interior mechanisms hereinafter described.

A rotor —5— is journaled in suitable bearings —6— in the end walls —2— and —2'— of the casing —1— coaxial therewith and is provided with a plurality of, in this instance two, sets of cylindrical bores or piston chambers —7—, each set comprising a series of, in this instance four, piston chambers arranged in uniformly spaced relation circumferentially about the axis of the rotor in axially spaced relation to the other set.

The external diameter of the rotor —5— is somewhat less than the interior diameter of the casing —1— to permit the operation of the valve ring or rings presently described in the intervening space, said rotor comprising a central cylindrical section —8— having central openings therein and opposite end hub sections —9— which are journaled in the bearings —6— and are removably secured to the central section —8— by bolts —10— or equivalent fastening means.

The central openings in the opposite ends of the cylindrical section —8— are of sufficient size to permit the passage of the crank shaft or crank shafts when the hub sections —9— are removed, said hub sections being provided with openings —11— to permit the passage of oil from the interior of the casing into the interior of the rotor for lubricating and other purposes.

The piston chambers —7— are formed in the central section —8— of the rotor radial to the axis of said rotor for receiving and guiding a corresponding number of pistons —12—.

Separate crank shafts —13— and —13'— are extended through registering openings in the opposite end walls —2— and —2'— of the casing —1— and hub sections —9— and are journaled in suitable bearings —14— in the inner ends of said hub sections for rotary movement relatively to each other and to the rotor —5—, each crank shaft being provided with a crank arm —15— adapted to rotate in the plane of the axes of the corresponding set of piston chambers —7—.

That is, the piston chambers —7— of each set are disposed in the plane of rotation of the corresponding crank arm —15— and are provided with a crank bearing —15'— upon which are journaled collars —16—.

Figure 2:
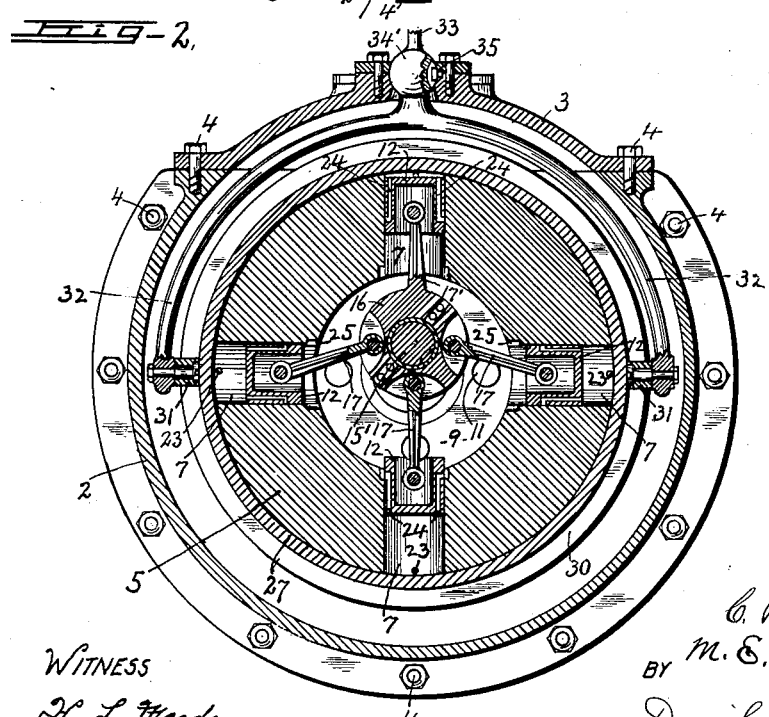
Fig. 2 is a transverse vertical sectional view taken in the plane of line 2—2, Fig. 1.

Each collar —16— is connected to the corresponding piston by pitmen or connecting rods —17— and —17'—, one of which, as —17'—, may be rigid with the collar and pivotally connected to its corresponding piston while the remaining pitmen —17— may be pivotally connected to the collar and to their respective pistons, as shown more clearly in Fig. 2.

Figure 1:
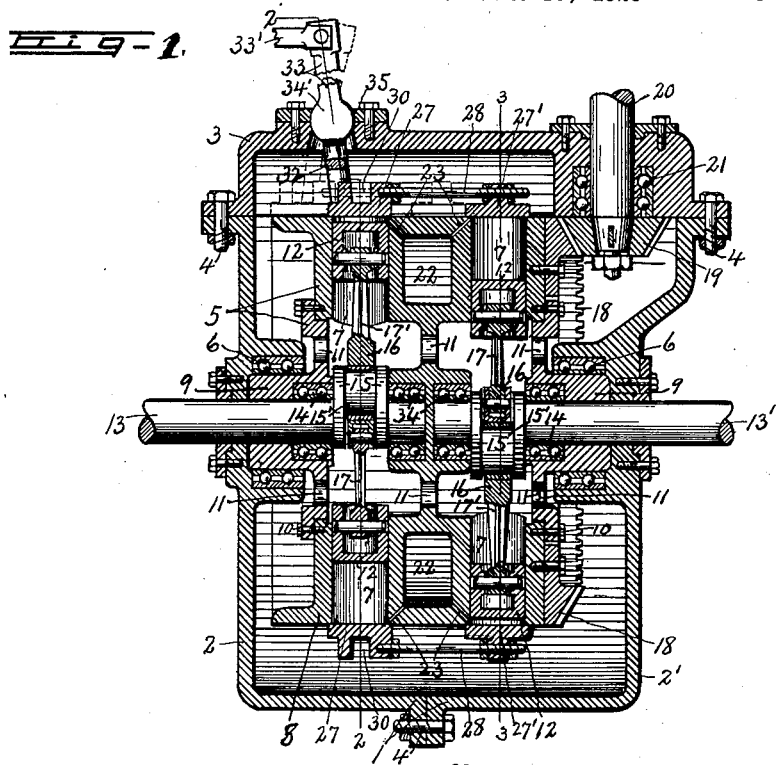
Fig. 1 is a longitudinal vertical sectional view of a hydraulic power transmission mechanism showing the rotor as provided with two sets of pistons and relatively adjustable valve rings for controlling the exit ports and connected to each other for simultaneous movement.

One of the hub sections —9— is provided with a beveled gear ring —18— meshing with a beveled pinion —19— on the inner end of a rotary drive shaft —20— which is journaled in suitable bearings —21— in the cap section —3— of the casing —1—, said drive shaft being extended outwardly through an opening in the cap section, as shown in Fig. 1.

The intermediate portion of the rotor —8— between the piston chambers —7— of each set is provided with an oil chamber —22— communicating with the outer ends of the piston chambers of both sets through restricted passages —23— to permit the circulation of a small amount of oil therethrough as the pistons are reciprocated when the valve rings for the exit ports of the piston chambers are more or less opened.

As shown more clearly in Figures 2 and 3, the outer walls of the pistons —12— are provided with bypasses —24— extending inwardly from the outer ends thereof and having their inner ends adapted to register with relatively short grooves —25— in the inner ends of the piston chambers —7— when the pistons reach the limit of their inward strokes to permit the oil to pass from the interior of the rotor through the registering passages —25— and —24— into the piston chambers at the outer ends of the pistons.

A pair of valve rings —27— and —27'— are slidable lengthwise of and upon the periphery of rotor —5— to and from positions across the outer ends of the piston chambers —7— of each set for controlling the exit of the liquid from said chambers, said valve rings being connected to each other for simultaneous movement by connecting rods —28— having screw connections with both of said rings for effecting relative endwise adjustment thereof as may be required to bring the valve rings into proper position for controlling the exit of the liquid from the piston chambers.

These valve rings —27— and —27'— are adapted to rotate with the rotor —5— and for this purpose may be secured thereto by a key —29—, as shown in Fig. 9.

One of the rings, as —27— is provided with an annular groove —30— for receiving diametrically opposite rollers —31— on the lower forked end —32— of a shifting lever —33—, the latter being provided with a spherical member —34'— adapted to engage with a corresponding socket —35— to form a universal joint between the shifting lever and the cap section —3— of the casing —1—. The upper end of the shifting lever —33— may be connected to any suitable operating member, as —33'— by which it may be moved about the center of the ball-and-socket joint for shifting the valve rings —27— and —27'— along and upon the periphery of the rotor —5— for opening and closing the outer ends of the piston chambers —7—.

In Figures 4, 5, 6 and 7 is shown modified forms of bypasses —24'—, —24''—, —24'''— and —24''''—, one for each piston and each controlled by its corresponding piston for permitting the oil to pass from the interior of the rotor into the piston chambers —7— at the outer ends of the pistons as the latter reach the limit of their inward strokes.

The rotor —5— is provided with an intermediate partition between the crank arms —15— for each set of pistons and is also provided with journal bearings —34— in which the adjacent ends of the shaft sections —13— and —13'— are journaled or reversely stated, the intermediate partition of the rotor —5— is journaled upon the inner ends of the shaft sections —13— and —13'—, said partition being also provided with openings —11— to permit the circulation of the oil therethrough to opposite sides of the partition for lubricating purposes, and also assuring a sufficient quantity of oil within the rotor to feed through the bypasses —24— into the piston chambers —7— at the outer ends of the pistons.

The collars —16— to which the pistons of each set are connected may be made in half sections to permit them to be placed upon their respective crank arms and then bolted together in any suitable manner, not necessary to here illustrate or describe but indicated in Fig. 2.

In Figures 8 and 9, we have shown a single crank shaft —13— as provided with a pair of crank arms —15— similar to those previously described, the intermediate portion of said shaft between the crank arms being journaled in the intermediate partition of the rotor —5— which is quite similar to that previously described except that the partition between the crank arms is imperforate to form separate chambers in the rotor at opposite sides of the partition in which the crank arms for each set of pistons are adapted to rotate.

In Figures 8 and 9 is shown a valve ring —27″— of sufficient length to extend across and some distance beyond the outer ends of the piston chambers —7— of both sets, one end (in this instance, the right-hand end) of the ring being adapted to open and close the outer ends of the piston chambers of the corresponding set, said valve ring being provided with inner lengthwise grooves or channels —37— of sufficient length to extend across the outer ends of the piston chambers of both sets when the valve ring is fully opened, as shown by dotted lines in Fig. 8.

That is, when the valve ring is adjusted to one position, as shown by full lines in Fig. 8, it will completely close the outer ends of the piston chambers of the corresponding set and will simultaneously register the grooves or channels with the outer ends of the piston chambers of the other set.

Or when the valve ring is shifted to the other position, as shown in dotted line, the grooves —37— will be registered with the outer ends of the piston chambers of both sets.

In the construction shown in Figures 8 and 9, communication between the interior of the case —1— and piston chambers is cut-off at all times so that the liquid operated upon by the pistons is confined to the piston chambers and to the channels —37—, even though the liquid may be present in the interior of the rotor —5— and case —1—, for lubricating purposes.

That is, the openings —11—, shown in Figure 1, are omitted in the construction, shown in Figures 8 and 9, for preventing the circulation of liquid from the interior of the rotor to the interior of the case and vice versa.

The object of this latter construction is to conserve the use of the liquid operated upon by the pistons.

Figure 10:
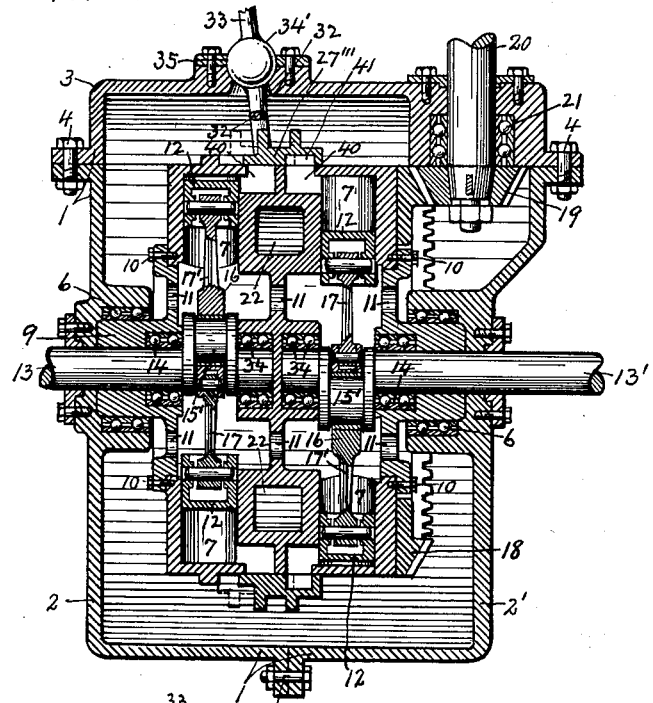
Fig. 10 is a longitudinal sectional view similar to Fig. 1 showing modified exit ports for the cylinders and a modified valve ring controlling said ports.

The construction shown in Fig. 10 is somewhat similar to that shown in Figures 1 to 3 inclusive except that the exit ports —40— of the piston chambers extend laterally and radially from the outer ends of said chambers, and that the valve ring as —27‴— is provided with a single set of relatively short channels or grooves —41— movable into and out of registration with one set of ports, while another portion of the same valve ring is movable into and out of registration with the other set of ports, see Fig. 10.

Figure 11:
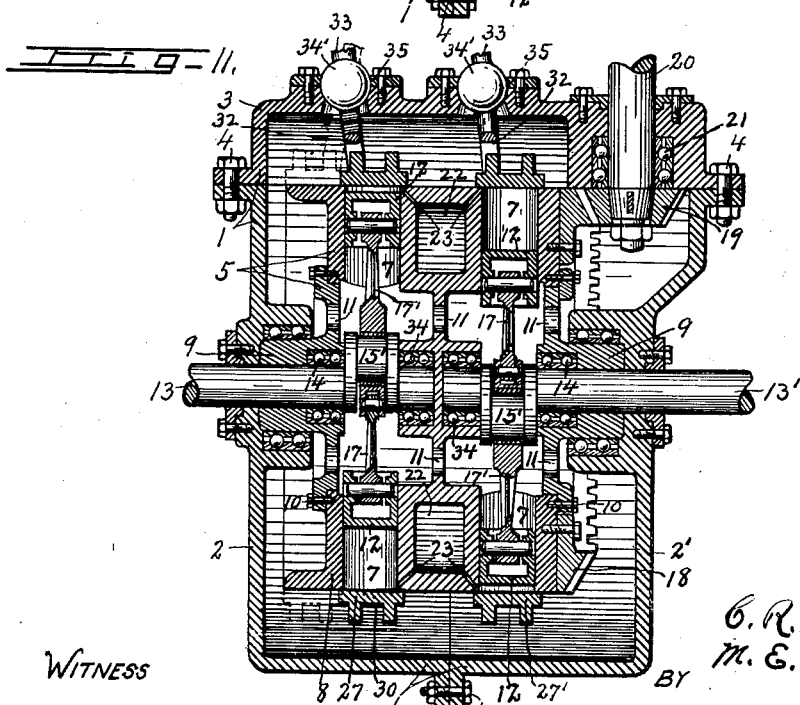
Fig. 11 is a longitudinal sectional view similar to Fig. 1 showing separate valve rings and separate shifting levers therefor, one for each set of cylinders.

The construction shown in Fig. 11 is similar to that shown in Fig. 1 except that the connecting rods —28— are omitted and each of the valve rings —27— and —27′— is adapted to be operated by a separate shifting lever, as —33—.

Operation

In the construction shown in Figures 1 to 7 inclusive, the adjustment of both of the valve rings —27— and —27′— to their closed positions across the outer ends of the piston chambers —7— serves to trap the liquid in said chambers between the valve rings and outer ends of the pistons against outward movement as the rotor is rotated.

It, therefore, follows that the rotation of the rotor —5— will be transmitted to the shafts —13— and —13′— through the medium of the hydraulically locked pistons and their pitman connections with the crank arms of said shafts.

On the other hand, when the valve rings —27— and —27′— are fully opened, as shown by dotted line in Fig. 1, thereby uncovering the outer ends of all of the piston chambers —7—, the pistons may have free radial movement in their respective chambers as the rotor is rotated without effecting any movement of the shafts —13— and —13′—, the reciprocal movement of the pistons being produced by reason of their eccentric connections with their shafts —13— and —13′—.

It is now evident that when the valve rings are closed, the shafts —13— and —13′— will be driven at the same speed as the rotor —5—. On the other hand when the valve rings are fully opened, the shafts —13— and —13′— will remain at rest while the rotor when being rotated may be idling or performing some other work.

If both valve rings have been shifted to their fully opened or neutral positions to allow the shafts —13— and —13′— to remain at rest while the rotor —5— is rotated and it is desired to drive said shafts, the valve rings may be gradually shifted toward their closed positions across the outer ends of the piston chambers —7— thereby causing a gradual retardation of the reciprocal movements of the pistons —12— and resultant gradual increasing speed of rotation of the shaft sections —13— and —13′— until the pistons are hydraulically locked by the complete closing of the valve rings at which time the shafts will be rotated at the same speed as the rotor.

It is, of course, understood that the case —1— and rotor —5— will be entirely filled with oil or other suitable liquid and that the outer ends of the piston chambers —7— will also be filled with the same liquid at all times.

When the valve rings are closed to hydraulically lock the pistons against reciprocal motion and thereby to effect the rotation of the shaft sections —13— and —13'— at the same speed as the rotor, the restricted vents —23— will still permit slight relative rotation of the shaft sections by connecting the compression side of one set of pistons with the suction side of the other set for differential speed purposes, as in road vehicles when turning corners.

That is, even though the rotor may be at rest and both of the valve rings —27— and —27'— closed, it would still be possible to turn either of the shaft sections independently of the other or both together by reason of the restricted vents —23— in the outer ends of the piston chambers.

The bypasses —24—, —24'—, —24''—, —24'''—, —24''''— shown in Figs. 3 to 7 inclusive co-operate with the corresponding piston to permit re-passage of oil from the interior of the rotor into the chambers —7— at the outer ends of the pistons as each piston reaches the limit of its inward stroke thereby assuring a sufficient amount of oil in the chambers to fill the same at all times during the operation of the rotor.

In Figures 8 and 9, the adjustments of the valve ring to the position shown by full lines will close the piston chambers of both sets for hydraulically locking their respective pistons against radial movement and thereby effecting the rotation of the shaft —13— as the rotor —5— is rotated.

In this construction, the liquid operated upon by the pistons is confined to both piston chambers and may or may not be present in the outer casing and for this reason, the valve is provided with the elongated channels or ports —37— whereby when the valve ring is shifted to the position, shown by dotted lines, the slots or channels —37— will connect corresponding piston chambers of both sets, thereby, allowing the liquid operated upon by the pistons to circulate therethrough while the rotor is idling and the shaft is at rest.

It is evident that the shifting movement of the valve ring from its dotted position toward its closed position will produce gradually increasing speeds of movement of the shaft —13— until the valve ring is completely closed at which time the shaft —13— will be driven at the same speed as the rotor.

In Fig. 10, the exit ports in the outer ends of the piston chambers are brought closer together than in the preceding figures and are controlled by a single valve ring —27'''— somewhat similar to that shown in Figures 8 and 9 except that the slots —41— are shorter but of sufficient length to connect both of the ports —40— when adjusted to its fully opened position at which time the liquid from the chambers of both sets will be free to pass from one set to the other as it is circulated by the reverse movements of the pistons.

It is evident, however, that when the valve —27'''— is in its closed position as shown by full line in Fig. 10, it will effectively trap the liquid in the cylinders of the corresponding set for hydraulically locking the pistons of that set against radial movement and thereby effecting the operation of the shaft sections —13— and —13'—.

In Fig. 11, the valve rings —27— and —27'— are controlled by separate shifting levers —33— thus permitting the operation of either of the shaft sections —13— and —13'— independently of the other, for example if both valve rings are closed as shown in Fig. 11 both of the shafts —13— and —13'— will be driven at the same speed as the rotor except for the slight differential speeds permitted by the vent openings —23—.

On the other hand, if one of the valves, as —27—, should be opened leaving the other valve —27'— closed, the shaft —13'— would then be driven at the same speed as the rotor but the other shaft —13— would be at rest by reason of the idling of the pistons of that shaft in their respective cylinders.

It is obvious that the opening of the valve ring —27'— while the valve ring —27— remains closed, will cause the driving of the shaft —13— while the shaft —13'— remains at rest.

What we claim is:—

1. In a hydraulic power transmission mechanism, a rotor having a plurality of sets of liquid containing chambers opening through the periphery thereof, those of each set being arranged in uniformly spaced relation circumferentially, pistons movable in said chambers, separate crank-shafts coaxial with the rotor, one shaft for each set of pistons, driving connections between the pistons and crank shafts, a valve-ring slidable endwise of and upon the periphery of the rotor across the openings in the outer end of both sets of chambers and having a portion thereof adapted to close said openings when in one position and another portion provided with a series of channels of sufficient length to connect the openings of both sets when adjusted to another position, and means for adjusting said valve-rings.

2. In a hydraulic power transmission mechanism, a rotor having a plurality of radial liquid containing chambers arranged in uniformly spaced relation circumferentially and provided wth exit ports opening through the periphery thereof at one side of said chambers, pistons movable in said chambers, a crank shaft coaxial with the rotor, driving connections between the pistons and crank shaft, a valve ring slidable endwise of and upon the periphery of the rotor for controlling said ports and means operable at will for shifting the valve-ring.

3. In a hydraulic power transmission mechanism, a liquid containing casing, a rotor journaled within the casing and provided with a plurality of radial liquid containing chambers arranged in uniformly spaced relation circumferentially about its axis and provided with exit ports opening through the periphery of the rotor, pistons movable in said chambers, a crank shaft coaxial with the rotor, driving connections between the pistons and crank shaft for rotating said crank shaft when the ports are closed, means for opening and closing said ports, said rotor being provided with an interior liquid containing chamber, and a by-pass in the walls of the pistons for permitting the flow of liquid from said rotor chamber into the piston chambers when said pistons are at the limit of their inward stroke.

4. In a hydraulic power transmission mechanism, a liquid-containing housing, a rotor journaled in the housing and provided with two sets of radial piston chambers and an oil chamber, pistons movable in said chambers, a pair of crank shafts journaled in the housing coaxially with the rotor, means connecting each crank shaft with a respective set of pistons, and restricted passages connecting the outer end portion of each piston chamber with said oil chamber substantially as and for the purpose set forth.

5. In a hydraulic power transmission mechanism, a liquid-containing housing, a rotor journaled in the housing and provided with two sets of radial piston chambers and an oil chamber, each of said piston chambers being provided with an exit port in communication with the interior of said housing, pistons movable in said chambers, a pair of crank shafts journaled in the housing coaxially with the rotor, means connecting each crank shaft with a respective set of pistons, restricted passages connecting the outer end portion of each piston chamber with said oil chamber, and means for opening and closing the ports of each set of piston chambers independently of the ports of the other set of chambers.

6. In a hydraulic power transmission mechanism, a liquid-containing housing, a rotor journaled in the housing and provided with two sets of radial piston chambers and an oil chamber, said piston chambers being provided with exit ports opening through the periphery of the rotor, pistons movable in said chambers, a pair of crank shafts journaled in the housing co-axially with the rotor, means connecting each crank shaft with a respective set of pistons, restricted passages connecting the outer end portion of each piston chamber with said oil chamber, a valve ring for the ports of each set of piston chambers slidable endwise of and upon the periphery of the rotor across the respective ports for opening and closing said ports, and means associated with each valve ring for shifting the same independently of the other valve ring.

In witness whereof we have hereunto set our hands this 11th day of May, 1929.

CLARENCE R. BUTTON.
MAYNARD E. ESTY.